Nov. 5, 1929.  W. H. FROST  1,734,371
SUPPORTER
Filed Nov. 18, 1925  2 Sheets-Sheet 1
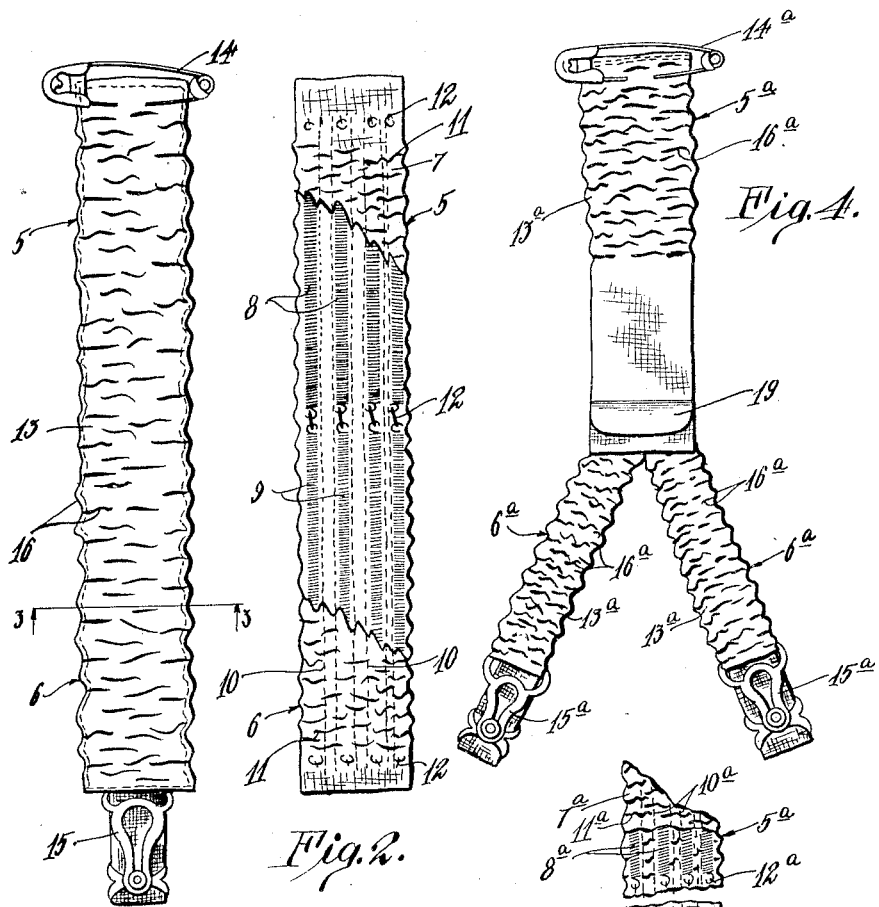
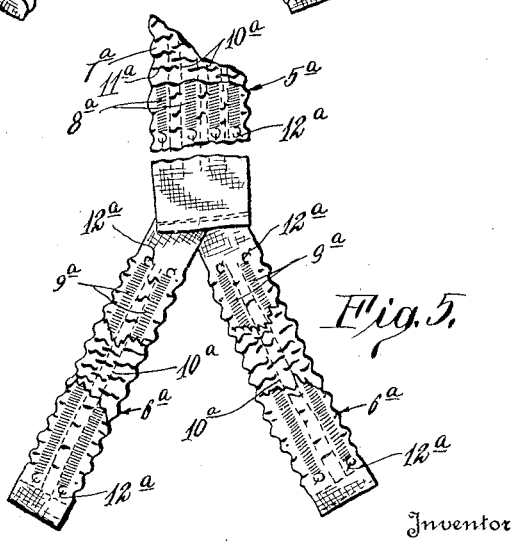
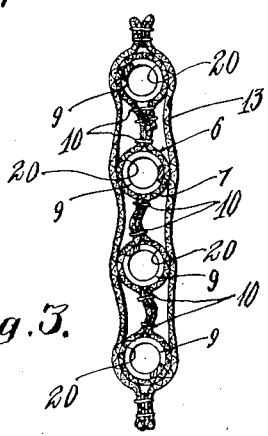
Inventor
Warren H. Frost.
By Lyon & Lyon
Attorneys.

Nov. 5, 1929.                W. H. FROST                1,734,371
                              SUPPORTER
                       Filed Nov. 18, 1925        2 Sheets-Sheet 2

Inventor
Warren H. Frost
By Lyon & Lyon
Attorneys

Patented Nov. 5, 1929

1,734,371

UNITED STATES PATENT OFFICE

WARREN H. FROST, OF LONG BEACH, CALIFORNIA, ASSIGNOR TO STEELLASTIC COMPANY, OF LOS ANGELES, CALIFORNIA, A CORPORATION OF CALIFORNIA

SUPPORTER

Application filed November 18, 1925. Serial No. 69,806.

This invention relates to supporters of the nature of belts, hose supporters, sleeve garters, suspenders, and the like, and an object of the invention, in general, is to provide a suitable substitute for supporter constructions employing rubber.

It is a matter of common knowledge that rubber is a perishable product, and that it soon loses its elasticity and that it stretches out and disintegrates, thus rendering useless the supporter in which it is employed.

An object of this invention is to produce an elastic supporter that will possess the elasticity of rubber at its best, while providing permanency of elasticity and unvariability in the elastic tension.

Fundamentally, the inventive idea is to employ small coil springs in place of rubber strands. The idea of employing coil springs is not new but, in order that such springs may be an effective substitute for rubber, I have provided certain structural features not heretofore employed.

Another objection to avoid, in the use of coil springs, is their pressing into the flesh of the wearer, especially across the bony portions of the body.

A still further objection to be avoided in using coil springs is the crude and inartistic appearance of the articles in which they are employed.

In order to overcome some of the objections and difficulties arising from the use of coil springs in place of rubber for elastic articles, I provide a flexible covering for the coil springs to protect them and also limit their extension. This has been previously done but my construction is such as to avoid in relatively long supporters, such as the hose supporters worn by women and children and suspenders, the overstretching of a portion or portions of the springs and consequent destruction of the elasticity of such portion or portions.

It is the custom to make the rubber elastics attached to women's corsets and girdles, for the purpose of attaching to and supporting the hose, of very stiff rubber to resist the sudden and strong pull occasioned when, for instance, the wearer stoops over. Such construction of the elastics causes a constant heavy pull on the thin silk hosiery and causes tearing thereof, especially when the rubber is new and in good condition.

To accommodate the supporter to the slight and ordinary movements of the body and to ordinarily bring but a slight pull upon the hose, I provide a primary elastic section that, relatively, is easily extended. This saves the hose and provides additional comfort. To take care of the long and severe strain when, for example, the wearer stoops over, I provide a secondary elastic section or sections having a greater degree of tension than the primary elastic section and, consequently, which does not yield until the primary section is nearly or fully extended, but which then takes the load, softly and without shock to the attached delicate hosiery. This construction is valuable in the saving of expensive hose, the addition of a comfort hitherto unknown, and absolute permanency of elasticity.

Instead of using springs of different strengths, I may use springs of equal strength but employ a less number of them for the easily extended section. For belts of various sorts also the plural elastic sections of different strengths may be used. In abdominal belts over the hips, where free play is desirable, the easily distended spring section will be used, while over the abdomen, where support is the desirable thing, the stiffer spring section will be used. Also in corsets or girdles, spring sections of different strengths will be employed. An important feature is the comfort secured by the very slight extension of springs required in order to maintain a uniform and constant tension, as there is no slipping or stretching. This obviates the unhealthy binding resulting with the use of rubber, especially when it becomes necessary to take up the slack because of the rubber stretching.

The accompanying drawings illustrate several forms of the invention:

Fig. 1 is a longitudinal view of a supporter constructed in accordance with the provisions of this invention.

Fig. 2 is a longitudinal view of the elastic sections employed in the form of supporter shown in Fig. 1, a portion of the primary casing being broken away.

Fig. 3 is an enlarged cross section on the line indicated by 3—3, Fig. 1.

Fig. 4 is a longitudinal view of a second form of the invention.

Fig. 5 is a fragmental view of the lower portion of Fig. 4 with the secondary casing omitted.

Figure 6:
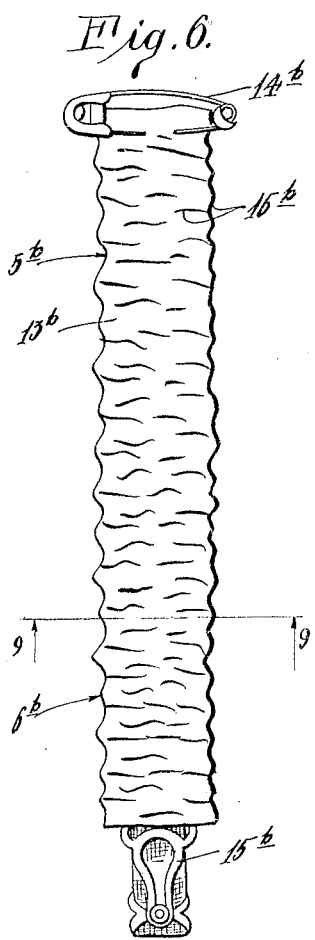
Fig. 6 is a longitudinal view of a third form of the invention.

The supporter shown in Figs. 1, 2 and 3 of the drawings has a plurality of elastic sections 5, 6 which comprise a primary member, preferably in the form of a sheath or casing 7 of any suitable flexible material and a plurality of sets of elastic members 8, 9, the combined strength of the elastic members 8 of the section 5 being different than the combined strength of the elastic members 9 of the section 6. In this instance the elastic members 8 are individually stronger than any of the elastic members 9 and are equal in number to the elastic members 9. The elastic members may be of any suitable construction and, in this instance, are coil springs. The elastic members 8, 9 are disposed in pockets 20 formed in the casing 7, said pockets being preferably separated by longitudinally extending double rows of stitching 10. The double stitching causes shirring or gathering of the fabric 7 as indicated at 11. The shirrs 11 tend to keep the springs apart so that when the springs are extended they will not form a narrower band than when they are contracted. Though a single row of stitching may be employed between each two adjacent springs, it would not function so well to prevent the springs tending to draw together when stretched. The opposite ends of the springs are secured by suitable means to the primary casing 7 and, in this instance, thread 12 is employed for this purpose. The primary casing thus connects the springs of one set to those of the other set.

The primary casing 7 is preferably constructed of cambric or other light weight fabric and is preferably inserted inside of a second sheath or casing 13 which may be constructed of a more elegant material. The secondary casing may, however, be omitted. The length of the primary casing 7 is somewhat less than that of the secondary casing 13 so that, when the supporter is fully extended, as well as at other times, the entire strain engendered by the tensioned springs will come upon the primary casing and not upon the secondary casing. The length of the primary casing 7 will be sufficient to permit of such extension of the springs 8, 9, as will not give their coils a permanent set. Thus the primary casing limits extension of the springs.

The supporter illustrated in Figs. 1, 2 and 3 is of the type worn by women and is secured to the clothing by a fastening device 14 which, in this instance, is a safety pin. The lower end of the secondary casing 13 is provided with a suitable means 15, of well known construction, for securing the supporter to the stocking. When the elastic sections are more or less contracted, the secondary casing 13 is full or lies in gathers 16 which constitute a soft protecting pad surrounding the springs to protect the wearer and her clothing from the springs and the shirrs 11.

The advantage of having the springs 8, 9 of different strengths is that the smaller movements of the wearer are compensated for by the lighter springs and any relatively great movements, as, for example, stooping, are compensated for by the extension of the heavier springs.

It is to be understood that the springs 8, 9 produce different degrees of tension in the different elastic sections 5, 6 and that the same result may be secured by employing a greater number of springs in one section than in the other rather than springs of different strengths, as will be clear from the following description of a modification of the invention.

Now referring more particularly to Figs. 4 and 5, for the modification there disclosed, the elements that functionally correspond with those above described will be indicated by the same reference characters with the addition of the letter "a." In this instance, the supporter is furcated, the elastic section 5ª forming the main body of the supporter and the elastic sections 6ª forming the furcations, and the springs 9ª in the sections 6ª may be of the same strength as the springs 8ª in the section 5ª. Adjustment of the length of the supporter may be made by a slide 19 on the section 5ª.

The number of springs in each of the sections 6ª is less than the number in the section 5ª, in this instance there being four in the section 5ª and two in each of the sections 6ª. In the lighter movements of the wearer, the sections 6ª will individually adjust themselves to such motions without causing extension of the springs 8ª and in the greater movements of the wearer the springs 8ª will also yield.

There is another great advantage in having the springs in longitudinally extending sets when the requirement is a relatively long elastic section as in the circle type of garter and the long straight type worn by women and children, for, if there were employed a single set of springs of relatively great length and of fine wire, as is necessary when the springs are used in multiple in lieu of rubber strands, they are liable to catch at some point on the cloth while the springs are being extended or stretched, thus causing such extreme tension of some portions of the springs as to give a permanent set to the coils of said portions, resulting in destruction of the elasticity of such portions. By employing the springs in a plurality of sets, however, when expansion of the springs takes place, the pull comes upon each spring at the points of attachment of said spring to the primary casing, and no spring can be stretched beyond the length of casing lying between the points of connection of the spring with the casing. The primary casing is "full" when the springs are contracted and the distance between the points of attachment of each spring is such that when the material between said points of attachment is fully extended, the spring cannot be extended or stretched sufficiently to give a permanent set to the coils of said spring, and the shorter springs are not as liable to catch as are longer ones.

Figure 7:
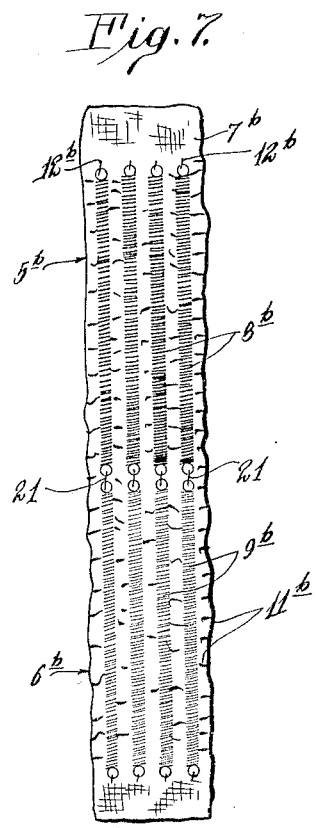
Fig. 7 is a longitudinal view of the elastic section employed in the form of supporter shown in Fig. 6.
Figure 8:
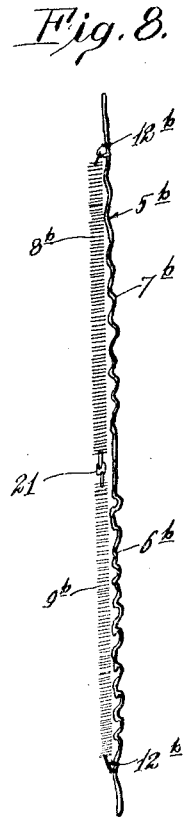
Fig. 8 is a longitudinal edge view of Fig. 7.
Figure 9:
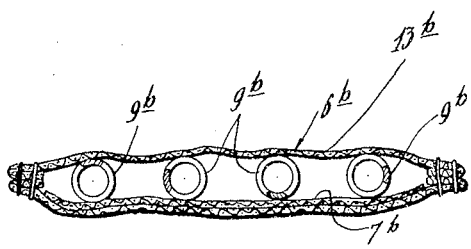
Fig. 9 is an enlarged transverse section on the line indicated by 9—9, Fig. 6.

Now referring more particularly to the third form of the invention illustrated in Figs. 6 to 9, inclusive, the elements that correspond in function with those described above in connection with Figs. 1 to 3, inclusive, are designated by the same reference characters with the addition of the letter "b".

An important difference between this form of the invention and that illustrated in Figs. 1 to 3 is that the two sets of springs of the elastic sections are directly connected by having the ends of the springs of one set fastened to the adjacent ends of the springs of the other set. The connection may be effected by links 21.

Another difference between this form of the invention and that shown in Figs. 1 to 3 is that the member 7$^b$, to which the outer ends of the springs are secured by the thread 12$^b$, is shown as extending along only one side of the springs and it will be readily understood that this member may be constructed to entirely enclose the springs, if such construction is desirable, it being unnecessary to illustrate the same since it will be understood from the disclosure in Figs. 1 to 3. Also, though the casing 13$^b$ is shown as enclosing the springs and member 7$^b$, it will be readily understood that the casing 13$^b$ may be omitted in some instances, without departing from the spirit and scope of the invention as expressed in some of the appended claims. This third form of the invention operates the same as that described for the first form excepting that the strain of the extended springs comes upon the member 7$^b$ only at the outer ends of the sets of springs.

I claim:

1. A supporter of the character described comprising a plurality of elastic sections including a primary casing of flexible material and a plurality of sets of coil springs in the casing secured at their opposite ends to the casing, the springs of one set being individually stronger than any of the springs of another of the sets, and the material being full when the springs are contracted.

2. A supporter of the character described comprising a plurality of elastic sections including a flexible member and a plurality of sets of coil springs secured at their opposite ends to the flexible member, the springs of one set being individually stronger than any of the springs of another of the sets, and the flexible member being full when the springs are contracted.

3. A supporter of the character described comprising a plurality of elastic sections including a flexible member and a plurality of sets of coil springs secured at their opposite ends to the flexible member, the combined strengths of the springs of one set being greater than the combined strengths of the springs of another of the sets, the flexible member being full when the springs are contracted, and the distance between the points of attachment of each spring being less than that permitting the spring to be stretched sufficiently to give a permanent set to the coils of the spring so that the springs of the first mentioned set will stretch after the springs of the second mentioned set have stretched to the limit imposed on them by the flexible member.

4. A supporter of the character described comprising a plurality of elastic sections including a primary casing of flexible material and a plurality of sets of elastic members in the casing secured at their opposite ends to the casing, the elastic members of one set being individually stronger than any of the elastic members of another of the sets, and the material being full when the elastic members are contracted.

5. A supporter of the character described comprising a plurality of elastic sections including a flexible member and a plurality of sets of elastic members secured at their opposite ends to the flexible member, the elastic members of one set being individually stronger than any of the elastic members of another of the sets, and the flexible member being full when the springs are contracted.

6. A supporter of the character described comprising a plurality of elastic sections including a flexible member and a plurality of sets of elastic members secured at their opposite ends to the flexible member, the combined strengths of the elastic members of one set being greater than the combined strengths of the elastic members of another of the sets, the flexible member being full when the elastic members are contracted, and the distance between the points of attachment of each elastic member being less than that permitting the elastic member to be stretched beyond its elastic limit so that the elastic members of the first mentioned set will stretch after the elastic members of the second mentioned set have stretched to the limit imposed on them by the flexible member.

Signed at Los Angeles, California, this 20th day of August, 1925.

WARREN H. FROST.